June 26, 1923.
A. H. URTUBEES
1,459,939
BLOW-OFF VALVE FOR PNEUMATIC TIRES
Filed April 10, 1922
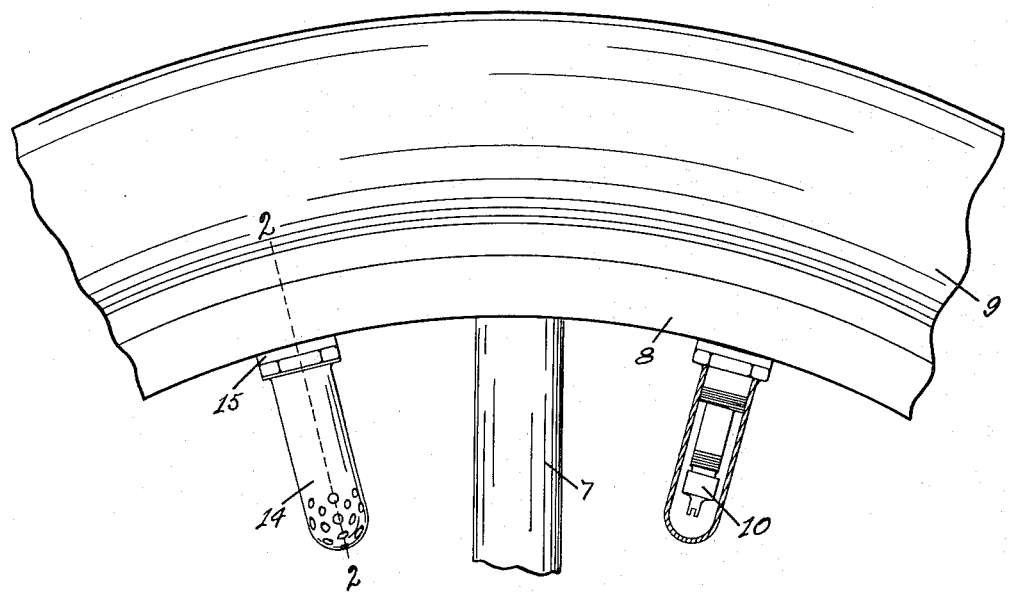
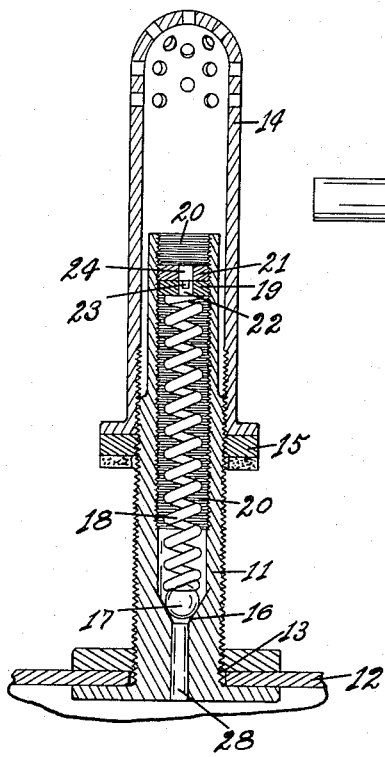
Inventor
A. H. URTUBEES
By A. E. Carlsen.
Attorney Patented June 26, 1923.

1,459,939

UNITED STATES PATENT OFFICE.

ALFRED H. URTUBEES, OF MINNEAPOLIS, MINNESOTA.

BLOW-OFF VALVE FOR PNEUMATIC TIRES.

Application filed April 10, 1922. Serial No. 551,367.

*To all whom it may concern:*

Be it known that I, ALFRED H. URTUBEES, a citizen of the United States, residing at Minneapolis, in the county of Hennepin and State of Minnesota, have invented certain new and useful Improvements in Blow-Off Valves for Pneumatic Tires, of which the following is a specification.

This invention has reference to devices for preventing excessive air pressure in pneumatic tires, and the main object is to provide an efficient and practical valve construction, which, when set at a predetermined pressure limit, will allow air to escape from the tire when a desired pressure is exceeded. The pressure of the air in a tire is often dangerously increased when the same is being inflated, and also when the car is driven over a hot road or pavement where the heat causes the air in the tire to expand and proportionately increase in pressure, resulting very often in "blow outs," especially where the casing of the tire is worn to a considerable extent.

A further object is to provide means in combination with such a valve structure for regulating the blow off pressure point of the same, so that air will be allowed to escape only when a predetermined pressure is exceeded. Further objects will be disclosed in the course of the following specification, specifically pointed out in the claim appended hereto, and clearly illustrated in the accompanying drawing, in which:

Fig. 1 is a detail fractional portion of a vehicle wheel, showing the application of my invention thereto.

Fig. 2 is an enlarged detail diametrical section through the valve embodying my invention, as seen substantially on the line 2—2 in Fig. 1.

Fig. 3 is an elevation of a regulating tool which may be conveniently used in adjusting the valve.

Fig. 4 is an enlarged detail view of the lock nut 21.

Figs. 5 and 6 are enlarged detail views of the adjusting nut or plug 19.

Referring to the drawing by reference characters, 7 designates the spoke of a wheel having a felly 8 and a pneumatic tire 9 thereabout, 10 indicating the usual valve through which the tire is inflated.

My improved safety valve consists of a main body member 11, which is tightly secured to the tire tube 12, as at 13, in any convenient manner. The outer side of the body member 11 is threaded to receive a perforated cap 14, and a nut 15 which clamps down onto the felly 8.

Within the body member 11, which is substantially hollow, is provided, near the lower end thereof, a valve seat 16, seating a ball 17. The ball 17 is held firmly in its seat by a spring 18, the upper end of which engages against an adjusting nut or plug 19 which screws in threads 20 on the inside of the body member 11. A lock nut 21 screws down on the adjusting nut 19 and serves to lock it in the position desired. The nut 19 is preferably formed with a central air escape port 22 and a transverse slot 23 in its upper face, while the nut 21 has a wide slot 24 running diametrically thereacross.

An ordinary screw driver may be used to adjust this valve, but it is found preferable to use an adjusting tool similar to the one shown in Fig. 3. This tool consists of a shank 25 having a screw-driver point 26 and a suitable handle 27. The shank may be graduated, as shown, so that a predetermined pressure desired is indicated when such indicating mark is even with the top of the body member 11, it being understood that the point 26 of the adjusting tool is seated in the slot 23 at such time.

When adjusting the pressure of the valve the cap 14 is first removed. It may also be found desirable to remove the lock nut 21, but this is not necessary. By turning said nut 21 one or two revolutions up it will allow the plug 19 to be rotated, and the slot 24 will allow the point 26 of the adjusting tool to drop down into the seat 23, at which time both members 19 and 21 may be turned simultaneously. Now if a pressure of no more than eighty pounds is desired in the tire the adjusting tool is turned down until the indicating character "80" is even with the top of the valve body 11. Then the tool is lifted up until it engages the slot 24 only. The nut 21 is then turned down tightly to lock the plug 19, when the tool is removed and the cap 14 replaced.

When an air supply tube is now applied to the valve 10, or when by reason of heated pavement the pressure in the tire increases to more than eighty pounds, then said air, which communicates with the valve seat 16 through a duct 28, raises the ball 17 against the pressure of the spring 18 until the pressure on each side of the ball is equal, or eighty pounds per square inch, when the escape will cease.

It is understood that suitable modifications may be made in the construction of this invention, provided, however, such modifications come within the spirit and scope of the appended claim. Having now therefore fully shown and described my invention what I claim to be new and desire to protect by Letters Patent is:

A valve of the character described having a spring adapted to yieldingly keep the same closed, an adjusting member adapted to regulate the tension of the valve spring and a locking member adapted to lock the adjusting member, said members being threaded within the valve, said adjusting member having a transverse groove in its upper face and said locking member having a transverse slot through which a tool may be dropped to engage said channel.

In testimony whereof I affix my signature.

ALFRED H. URTUBEES.